United States Patent [19]

Wichers

[11] 4,240,718
[45] Dec. 23, 1980

[54] SPORTS SPECTACLE STRUCTURE

[76] Inventor: Max F. Wichers, Main Mall, White Lakes Center, 3636 Topeka Blvd., Topeka, Kans. 66611

[21] Appl. No.: 872,683

[22] Filed: Jan. 26, 1978

[51] Int. Cl.³ .................. G02C 11/08; G02C 3/00
[52] U.S. Cl. ................................ 351/62; 351/83; 351/111
[58] Field of Search ............ 351/41, 42, 44, 110, 351/111, 47, 48, 53, 83, 86, 121, 57; 2/10–15, 424, 426, 427, 430, 436, 443, 444, 447; 16/128 A; D2/263, 277, 231, 41, 233, 234; 350/179

[56] References Cited

U.S. PATENT DOCUMENTS

| 2,321,159 | 6/1943 | Ryan | 2/441 |
| 2,359,435 | 10/1944 | Miller, Jr. | 2/12 |
| 2,617,100 | 11/1952 | Moeller | 351/41 |
| 3,049,716 | 8/1962 | Stegeman | 2/443 |
| 3,120,002 | 2/1964 | Blumenthal | D2/234 X |
| 3,160,735 | 12/1964 | Aafright | 351/41 |
| 3,229,303 | 1/1966 | Jonassen | 2/443 |
| 3,383,155 | 5/1968 | Bourke | 351/155 |
| 3,383,707 | 5/1968 | McNeill | 2/12 |
| 3,497,294 | 2/1970 | Volk | 351/111 |
| 3,675,991 | 7/1972 | Brenn | 351/41 |
| 3,701,591 | 10/1972 | Wichers | 351/41 |
| 3,944,344 | 3/1976 | Wichers | 351/41 |
| 3,944,345 | 3/1976 | Decorato | 351/43 |

FOREIGN PATENT DOCUMENTS 2322500 11/1974 Fed. Rep. of Germany ............ 351/86

Primary Examiner—Paul A. Sacher
Attorney, Agent, or Firm—Fishburn, Gold & Litman

[57] ABSTRACT

A spectacle structure for wear during active sports where eye protection is desired includes a protective panoramic or wrap-around frame and portions snugly engaging spaced parts of the head to support the frame on the head of a person. Lenses, such as prescription lenses, are fitted into the frame with removable transparent guard lenses thereover and spaces are provided for ventilation of the lenses and the person's eyes to aid in remedying condensation and discomfort.

8 Claims, 8 Drawing Figures

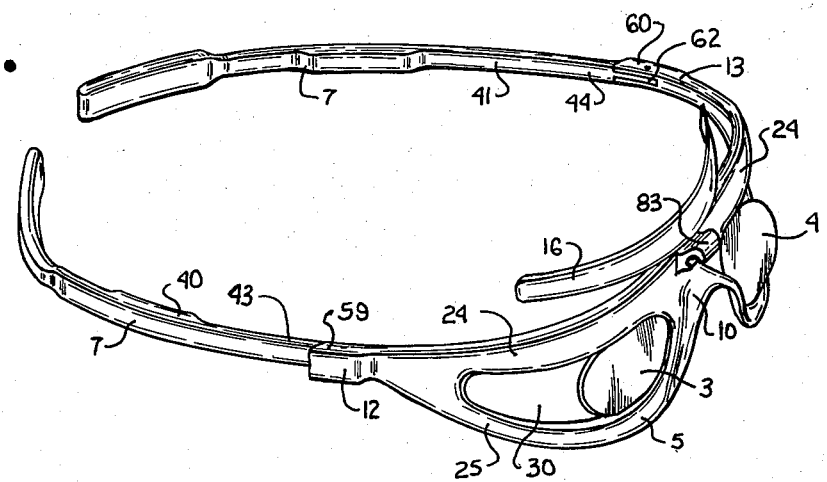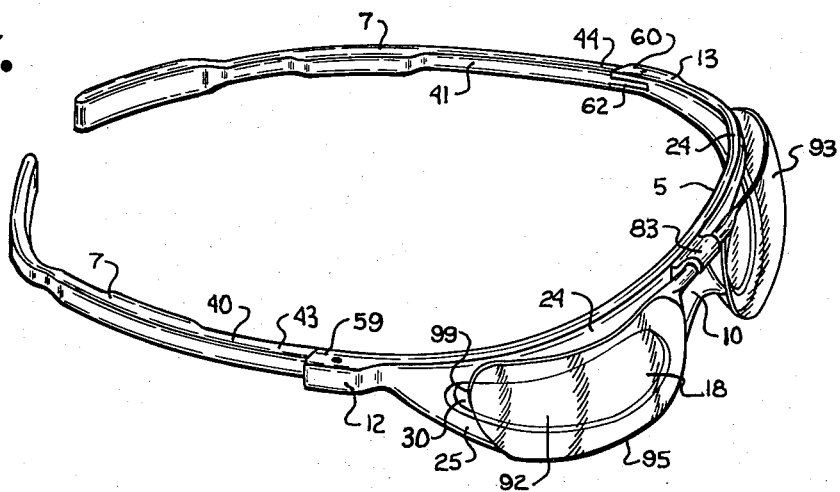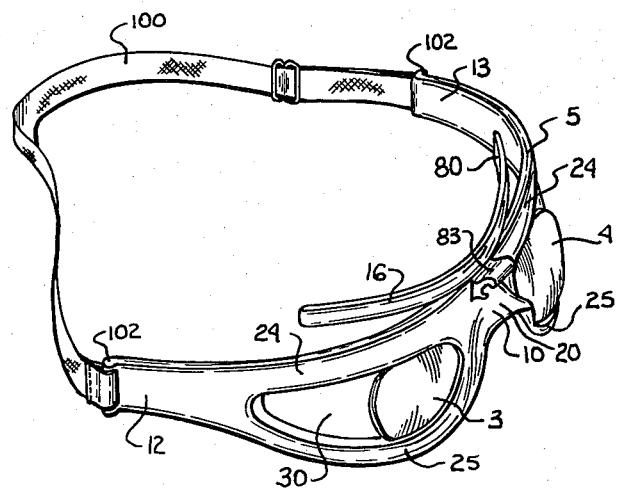

SPORTS SPECTACLE STRUCTURE

The present invention relates to spectacle structures and more particularly to spectacle structures which are comfortable for use while engaged in active sports and protect the eyes of a person wearing same.

Heretofore, protective spectacles have not provided sufficient protection to the wearer or have alternatively provided such a close, tight fit that air is prevented from circulation behind a substantial portion of the structure thereof, resulting in fogging of the lenses and/or discomfort to the wearer. Furthermore, such spectacles often have the major portion of the weight thereof concentrated forward of the face of the wearer and therefore, tend to bear on and slide down the nose, thus requiring frequent adjustment thereby interfering with the person's work or play and rendering the spectacle unsuitable for extended periods of wear.

The principal objects of the present invention are: to provide a sports spectacle structure that overcomes the aforementioned difficulties and that can be worn for extended periods without discomfort; to provide such a sports spectacle structure having portions engaging the nose, brow, and the back of the head for properly positioning and maintaining the spectacle structure on the head of a person engaged in sports or similar rigorous activities and wearing same; to provide such a sports spectacle structure providing protection to the eyes of the wearer; to provide such a sports spectacle structure having prescription ground optical lenses fitted therein and supported thereby; to provide such a sports spectacle structure having a transparent cover member or guard lens connectible therewith and selectively pivotable to and from eye openings covering position; to provide such a sports spectacle structure having arms thereof which maintain same in proper and comfortable position on the head and substantially reduce irritation and pressure on portions thereof, such as caused by portions of conventional spectacle structures; and to provide such a sports spectacle structure which is economical to manufacture, durable in construction, easily placed on the head of a person wearing same, sufficiently tight-fitting to permit freedom of movement of the head without dislodging the spectacle structure, and particularly well adapted for the proposed use.

Other objects and advantages of this invention will become apparent from the following description taken in connection with the accompanying drawings wherein are set forth by way of illustration and example certain embodiments of this invention.

FIG. 6 is a perspective view of an embodiment of spectacles including prescription lenses and a brow engaging bar.

FIG. 7 is a perspective view of an embodiment of spectacles showing a front frame member with a cover member connected thereto.

FIG. 8 is a perspective view of the spectacles showing an embodiment of spectacles having lenses fitted therein, a brow engaging bar, and a flexible elastic band for connecting the spectacles to the head of a person.

Figure 1:
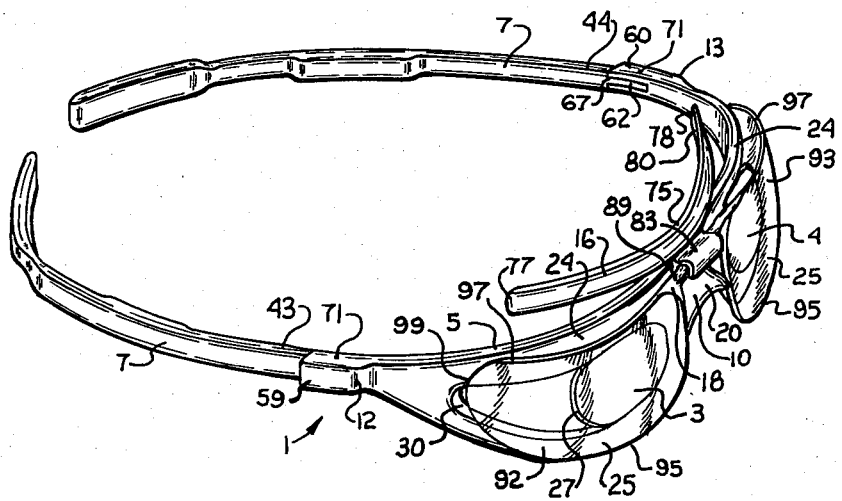
FIG. 1 is a perspective view of a sports spectacle structure embodying features of the present invention and including a brow engaging member or bar and a cover member.

As required, certain embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring more in detail to the drawings, the reference numeral 1, designates generally a sports spectacle structure having portions for protection of eyes of the wearer from impacts and particles during work or play. In the structure illustrated in FIG. 1, the spectacles have a curved or head engaging shape and portions protecting sensitive areas of the head whereby the spectacles conform to the head of the person wearing same to be securely retained thereon and provide protection for the eyes against damage by foreign objects. The spectacles 1 include a pair of lens means, such as lenses 3 and 4 retained within a bilaterally symmetrical front frame member 5 and elongated head engaging means 7 extended therefrom for engagement with the side and rear portions of a person's head.

Figure 2:
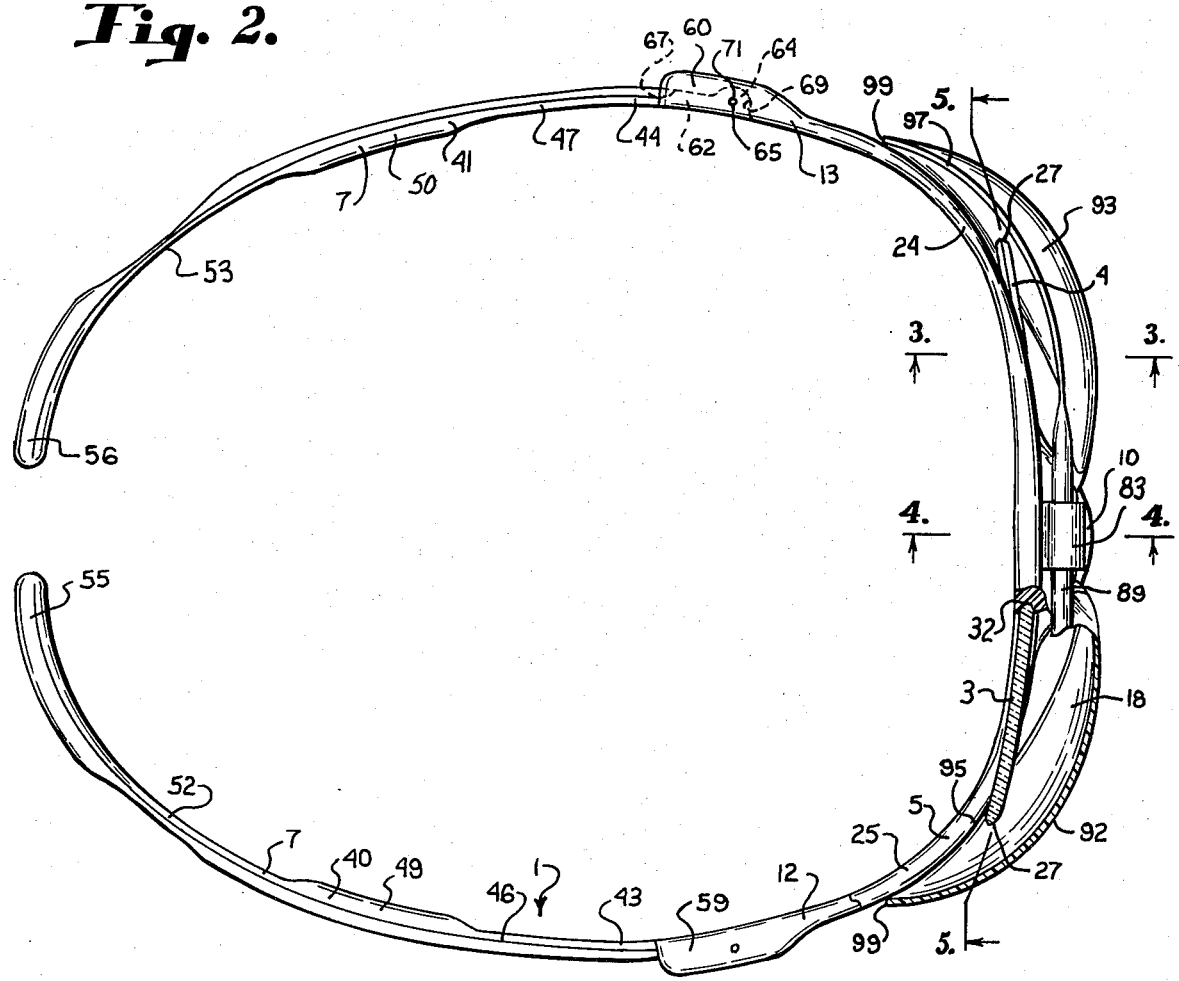
FIG. 2 is a plan view of the spectacles shown in an in use position and having portions thereof broken away to show certain details of the lenses.
Figure 3:
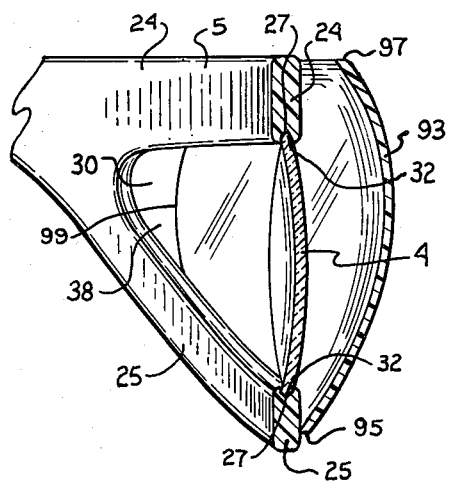
FIG. 3 is a fragmentary sectional view of the spectacles taken along line 3—3, FIG. 2 and showing a lens fitted therein and including a cover member or guard.

The front frame member 5 is arcuate in plan view, FIG. 2, and is of the form variously described as panoramic or wrap-around. The front frame member 5 has a center portion 10 and opposite end portions 12 and 13 with said frame member 5 of such a length that said end portions are substantially at the sides of the wearer's forehead and rearward of the eyes. In the illustrated structure, the end portions 12 and 13 are enlarged to form respective portions of hinges, as later described.

The front frame member 5, illustrated, has a brow engaging portion, such as a bar 16, positioned thereabove and extended inwardly for engaging the forehead adjacent to and above the wearer's eyebrows and a transparent cover or guard member 18 positioned thereover in protective relation to the lenses 3 and 4. The details of the front frame member 5 and the overall shape of the cover member 18 permits the spectacles 1 to retain corrective lenses 3 and 4 and as well to remain securely and comfortably on a person's head and ward off blows which otherwise might damage the wearer's eyes.

The wrap-around shape of the front frame member 5 provides a structure which follows the contours of the face to provide protection for the eyes against blows from foreign objects and from small objects when fitted with a cover member 18 of transparent material and of similar wrap-around configuration, and if of sun glass material from strong light directed from peripheral points.

In many instances, the vision of the wearer must be corrected through the use of lenses ground according to a prescription determined by a qualified opthalmologist. As used herein, the term "lens" is to be understood as a piece of glass, preferably safety glass, or other opthalmically suitable transparent substance, such as, the acrylate-methyacrylate polymers, or the methyl methacrylate polymers, and the like, and having two opposite regular surfaces, either both curved or one curved and the other plane and used for forming an image by changing the direction of rays of light. These lenses are usually oval or even cylindrical in shape and by their nature cannot be substantially longitudinally curved to form a wrap-around shape. In other words, prescription ground optically corrective lenses cannot be formed in a wrap-around shape and a wrap-around frame, such as the front frame member 5, must be adapted for use with such lenses as described below. It is to be understood that it is within the contemplation of the present invention that the sports spectacles 1 can be used, not only with prescription lenses of conventional, generally oval shape, but also with plano or uncorrected lenses, such as used for non-corrective sunglasses or safety glasses and which are not wrap-around and generally of the shape of prescription lenses.

The spectacles may be supported off the nose by portions engaging the person's brow and head or by a combination thereof including nose engaging portions. The front frame member 5, illustrated, includes a nose engaging bridge portion 20 formed in the center portion 10 and having a smoothly outwardly concave surface 21, FIG. 4, to conform comfortably and substantially to the bridge of the nose. Extending adjacently and on opposite sides of the center portion 10 are upper and lower rearwardly converging frame bows 24 and 25 comprising supporting and marginal members spaced vertically to define elongated, generally tear-drop shaped openings 30. The openings 30 generally conform to the eye socket openings of a typical adult and the bows 24 and 25 in effect from extensions of the portions of the skull forming the socket, thereby providing protection to the eye openings against fast moving objects such as handballs, racquetballs, and the like. The openings 30 extend laterally outwardly from adjacent the bridge portion 20 to the sides of the front frame member 5 and, in the illustrated example, contain the lenses 3 and 4 therein. The openings 30 also include a substantial space 38 not covered by the area of the lenses 3 and 4 when positioned therein for the movement of fresh air behind the front frame member 5 for ventilation and cooling to otherwise enclosed areas.

The front frame member 5 is preferrably constructed of a readily formed synthetic thermoplastic resin which is durable, strong, and has desired flexibility in the separate sections, for example, polyethylene, polypropylene, nylon and the like. The preferred material is slightly elastically resilient to contractively retain the lenses 3 and 4 within the upper and lower bows 24 and 25 when slightly resiliently spread.

Figure 5:
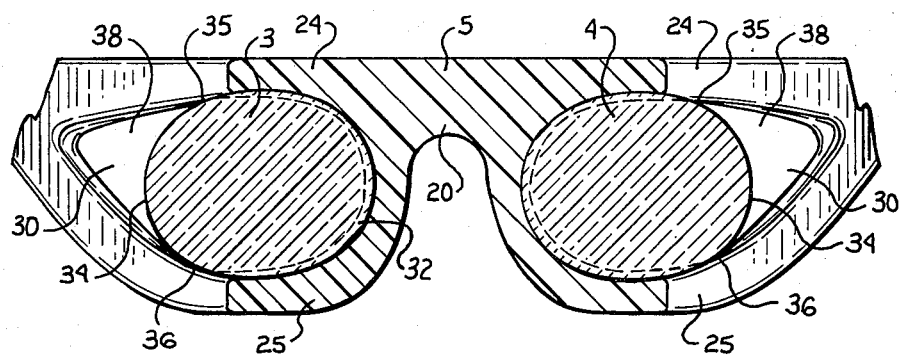
FIG. 5 is a fragmentary sectional view of the spectacles taken along line 5—5, FIG. 2 and showing details of the connection between the lenses and the front frame member.

In the illustrated example, the marginal circumference of the lenses 3 and 4 includes bevels 27 which tend to prevent chipping or the like of the lens edge. Lens engagement means, such as grooves 32 having an interiorly bevelled configuration providing mating surfaces for the bevels 27 extend annularly around a substantial part of the openings 30 between the upper and lower bows 24 and 25 and adjacent the center portion 10. It is to be noted that the lenses 3 and 4 do not fully cover the openings 30 as the openings curve rearwardly for the lenses 3 and 4 have substantially lesser curved longitudinal axis relative to the openings 30. Accordingly, the grooves 32, FIG. 5, extend into the interior margins of the upper and lower bows 24 and 25 adjacent the center portion 10 and toward the end portions 12 and 13 in a shape commensurate with the lenses 3 and 4 and terminating at spaced upper and lower points 35 and 36 intersecting the rearward curvature of the bows 24 and 25. The points 35 and 36 are positioned on the bow portions 24 and 25 on the converging portions of the curve of the outer portions of the lenses 3 and 4 for a contractive grip thereof, thereby positively retaining the lenses 3 and 4 and requiring spreading of the bow members 24 and 25, in the illustrated example, as the lenses 3 and 4 are removed.

Thus, open spaces 38 are retained in the openings 30 between the respective ends 12 and 13 and the lens ends 34 after fitting the lenses 3 and 4 into the front frame member 5 for ventilation and circulation of air therebehind, thereby inhibiting fogging or condensation occurring on the lens surface and relieving the stuffy discomfort often associated with close fitting or enclosed goggles. The ventilating or open spaces 38 are particularly important where the spectacles 1 are worn during activities occurring during often cold weather, such as football, during which tight fitting glasses are especially subject to fogging.

In the embodiments of the invention shown in FIGS. 1, 2, 6, and 7, the head engaging means 7 include arms 40 and 41 which are similar in shape and function to the arms shown in the Wichers U.S. Pat. No. 3,944,344 issued Mar. 16, 1976. The arm members 40 and 41 are each elongate and arcuate in plan view. The arm members 40 and 41 and the front frame member 5 each have a cross-sectional shape for substantially the lengths thereof that are bar-like in a vertical dimension when on a wearer and substantially greater than the transverse or horizontal dimension. This relationship provides stiff members in the vertical plane and bendable members in the horizontal plane. The arms 40 and 41 illustrated have one end portion 43 and 44 thereof shaped to form respective portions of the hinges, as later described. The arms 40 and 41 have first reduced thickness portions 46 and 47 and positioned adjacent to the ends 43 and 44 respectively to define first flexible portions to permit uni-directional bending of the arms 40 and 41 toward and away from the wearer's head.

The arms 40 and 41 have center portions 49 and 50 of increased thickness to provide increased resistance to unidirectional bending. Second reduced thickness portions 52 and 53 are positioned adjacent to other ends 55 and 56 of the arms 40 and 41 respectively. Second reduced thickness portions 52 and 53 provide flexible portions to permit uni-directional bending adjacent to the other end portions 55 and 56. From a comparison of FIG. 2, it is obvious that the various portions of the front frame member 5 are thicker than the respective reduced thickness portions of the arms 40 and 41, thereby permitting variable, uni-directional bending of the arms 40 and 41 to permit the spectacle structure 1 to conform to the shape of the rear portion of the head of a person wearing same.

The other or free end portions 55 and 56 of the arms 40 and 41 are enlarged as first seen in FIG. 2. The end portions 55 and 56 may have weights, (not shown) respectively therein for facilitating engagement and balance of the other ends 55 and 56 relative to the front frame member 5 and thereby substantially resist any tendency of the front frame member 5 from moving downwardly on the forehead of the person.

Hinge means 59 and 60 pivotally connect the arms 40 and 41 to the front frame member 5 for horizontal movement toward and away from each other. In the illustrated example, the hinge means 59 and 60 have protuberances 62 extended from the ends 43 and 44 which terminate in a rounded knob 64 having a vertically directed bore 65. The frame ends 12 and 13 include engaging portions having a longitudinally aligned slot 67 extended thereinto and terminating in a recess 69 for a snug fit with the protuberances 62 and knob 64. To connect the two portions together and provide a pivotal axis, a pin 71 is extended vertically through the ends 12 and 13 and through the center of the recess 69 and the bore 65.

The brow bar 16 illustrated is an elongate, generally arcuate member having a central portion 75 and opposite ends 77 and 78 with a smooth surface 80 to engage the brow of the wearer. For the purposes of this invention, "brow" is defined as the superciliary ridge over the eyes and includes the eye brows and the forehead. The central portion of the brow bar 16 is connected to the center portion 10 of the front frame member 5 in side-by-side relationship, FIG. 1. The brow bar 16 extends inwardly of the front frame member 5 toward the wearer and distributes the portion of the weight of the spectacles 1 which would otherwise be supported only by the nose through engagement with the bridge portion 20.

Figure 4:
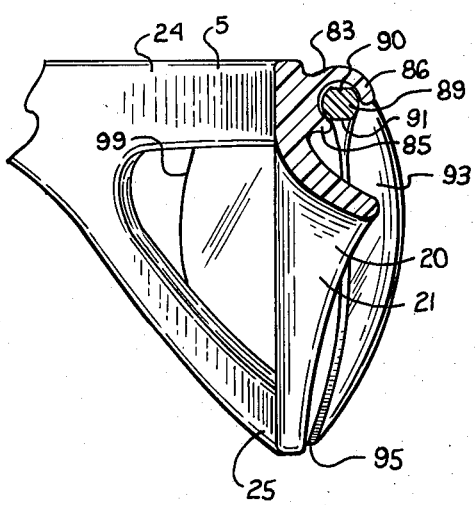
FIG. 4 is a fragmentary sectional view of the spectacles taken along line 4—4, FIG. 2 and showing details of the pivotal and removable connection between the cover member and a front frame member.

The cover member 18 is connected to the spectacle structure by an engagement means 83 which, in the illustrated example, is positioned on the central portion 10 and includes a projecting portion, FIG. 4, having spaced arcuate arms 85 and 86 with free ends thereof spaced apart to define a generally round receptacle for receiving and frictionally detachably engaging a generally cylindrical center member 89 of the cover member 18. The arm members 85 and 86, being slightly flexive relative to each other, permit the cylindrical center member 89 to be snapped into engagement therebetween and be pivoted vertically about a horizontal axis when the spectacles 1 are worn. This "flip-up" motion allows the wearer to selectively pivot the cover member 18 into and out of viewing relation as desired. Should it be desired to remove the cover member 18 from the front frame member 5, this can be easily done by rotating the cylindrical center member 89 upwardly until upper and lower flattened portions 90 and 91 thereof are aligned with the opening formed by the arm members 85 and 86 and drawing the center member 89 from the arm members 85 and 86. The cover or guard member 18 comprises spaced panoramic or wraparound covers 92 and 93 disposed from the lenses 3 and 4 and having portions, such as lower edges 95, engaging portions of the front frame member 5, such as the lower bow 25 and not engaging the lenses 3 and 4, thereby protecting the latter from blows and the like. Upper edges 97 are disposed from the upper bow 24 and provide space for ventilation and circulation of air around the lenses 3 and 4 and the eyes of the wearer. In the illustrated example, the covers 92 and 93 have ends 99 terminating short of the ends of the openings 30, thereby retaining space for ventilation there as well as between the edges 97 and the upper bow 24.

The cover member 18 may be of tempered glass, but preferably is constructed of a opthalmically suitable plastic or synthetic resin which is free of distortion and is durable, resistant against blows, and has desired flexibility, for example, the acrylate-methacrylate or methyl methacrylate polymers. The cover member 18 can be formed of transparent material of various tints, such as amber, gray, green or similar light enhancing or light reducing colors for such uses as sun shields, shooting glasses, or the like. Alternatively, the cover member 18 can be formed of clear material without coloration or tint for use as safety glasses when working in conditions conducive to eye damage.

The embodiment of the invention, as illustrated in FIG. 1, includes the front frame member 5 with lenses 3 and 4 fitted therein, as previously described, a brow bar 16, a cover member or guard 18 and head engaging arms 40 and 41. This structure is well adapted for general sports or recreational wear and is comfortable for extended wear. The shape of the arms 46 and 47, the brow bar 16, and the nose bridge portion 20 combine to efficiently distribute the weight of the spectacles and effectively retain the structure on the head of the wearer. Additionally, the detachable "flip up" cover member or guard 18 can be tinted to form sunglasses or left without coloration to form industrial safety glasses.

Wearing the spectacles 1 is accomplished by moving the front frame member 5 and the head engagement means 7 downwardly over the head of the wearer until the bridge portion 20 engages with the nose and/or the brow bar 16 rests upon the eyebrows or forehead and the lenses 3 and 4 are in the desired position. The flexible arms 40 and 41 permit the spectacles 1 to conform to the shape of the person's head and exert inwardly directed forces or pressure on the forehead, sides and rear portions of the head of the person to thereby maintain same in the desired protective position during even rigorous movements of the head. Moreover, the upper and lower bow members 24 and 25 of the front frame member 5 are spaced to conform to the bones surrounding the eyesocket of the wearer in such a manner to protect the eyes thereof from most balls and the like used in sports activities. For example, a standard handball or racquetball would be prevented by the bow members 24 and 25 from contact with the eyes of the wearer. The cover member or guard 18 provides even greater protection through the covers 92 and 93 which completely extend over the width of the openings 30 and the lenses 3 and 4 and a substantial portion of the length of the openings.

The modified form illustrated in FIG. 6 differs from the spectacles 1 illustrated in FIGS. 1 and 2 in that the cover member or guard 18 thereof is removed, as would be done in those situations where the guard serves as sunglasses and there is no need for eye protection from strong sunlight. This embodiment is provided with a mounting for guards 18 so different forms of guards or lenses, such as shooting lenses, may be applied for accommodating various uses of the protective spectacles.

The modified form of the invention illustrated in FIG. 7 differs from the spectacles 1 illustrated in FIGS. 1 and 2 and is useful where vision correction is not required but it is desired to provide a guard or lens for protection against particles or for shooting glasses or other sports wear. In this form the prescription lenses 3 and 4, FIG. 1, and the brow bar 16 are not used thereby forming a spectacle structure having a front frame member 5, head engaging arms 40 and 41 and a cover member or guard 18. This structure provides the protection by the front frame member in racquetball and the like, provides ventilation and by variation of the color or tint of the guard provides sunlight protection, shooting glasses or protection in general sports wear.

The modified form illustrated in FIG. 8, includes a front frame member 5, lenses, such as prescription lenses 3 and 4, and a brow bar 16. A head engaging means is connected to the front frame member 5 and comprised of an elongated, flexible elastic band 100, is secured to the end portions 12 and 13 by suitable connectors, such as pins 102. This embodiment may be worn during very rigorous activities calling for even greater positive engagement with the head than that provided by the arms 40 and 41. Additionally, the band 100 lies flat against the head and can be worn under relatively snug head gear, such as protective helmets for football and the like.

While the invention has been illustrated and described in various embodiments, it is not to be limited to the specific forms or arrangement of parts herein described and shown.

What is claimed and desired to secure by Letters Patent is:

1. A spectacle structure for use in sports and the like to protect the wearer's eyes from moving objects comprising:
   (a) a wrap-around front frame member having portions curvingly extended around the front of the head and rearward of the eyes of a person wearing the spectacle structure at a level adjacent to the eyes, said front frame member having portions for engaging selected areas of the front of the person's head and including a centrally positioned bridge portion with respective slightly elastically resilient upper and lower bow portions extended laterally outwardly therefrom and curved rearwardly in converging relation and joining in rearwardly positioned end portions, said bow portions being separated and forming spaced apart guard members defining elongated, rearwardly curved, generally tear-drop shaped openings extending rearward of the eyes of a person wearing the spectacle structure and permitting vision therethrough with the guard members protecting a person's eyes from large objects;
   (b) lens means having substantially lesser curved horizontal axes than said rearwardly curved openings and mounted within a portion of said openings forwardly of a wearer's eyes adjacent said bridge portion, said lens means being contractively supported by said upper and lower bow portions, said openings having substantial space portions not covered by the area of the lens means and extending in curved relation outwardly and rearwardly of said lens means exposing a lateral end of said lens means; and
   (c) head engaging means connected to said end portions of said front frame member and extending rearwardly therefrom and cooperating with said front frame portions for engaging selected areas of the person's head for maintaining said front frame member in position on the wearer's head and the lens means in aligned position relative to the person's eyes.

2. The spectacle structure set forth in claim 1 wherein said front frame head engaging portions include:
   (a) an elongate brow engaging member positioned slightly above and connected to said front frame member, said brow engaging member extending rearwardly of said front frame member and having a rear surface for engagement with a person's brow and cooperate with said head engaging means to support the front frame member in forwardly spaced relation from the wearer's face and eyes.

3. The spectacle structure as set forth in claim 1 including:
   (a) a cover guard member connected to said front frame member in forwardly spaced relation thereto and having laterally spaced transparent, wrap-around portions positioned generally in overlying relation to the respective lens means and said openings, said transparent, wrap-around portions each being larger in width than the spacing between the respective bow portions and extending substantially the length of said openings to shield same from moving objects.

4. The spectacle structure set forth in claim 3 wherein:
   (a) said cover guard member and transparent portions conforming generally to the curvature of said front frame member and having spaced apart conact points with said bridge and bow portions for maintaining and supporting relative positions of the cover guard member and front frame member to receive impacts, said transparent portions being spaced from said bridge and bow portions between said contact points and permitting ventilation around said spectacle structure.

5. The spectacle structure as set forth in claim 1 wherein:
   (a) said bridge and bow portions of the front frame member include channels extended therein and generally annularly around the portion of said openings in which the lens means are mounted to provide a lens means receiving portion having a shape substantially commensurate with a substantial portion of the lens periphery, the laterally outer points of engagement of the lens means in the bow channels being in converging portions of said bows.

6. The spectacle structure set forth in claim 5 wherein:
   (a) said head engaging means include a pair of arms each having a center portion and first and second portions of reduced thickness adjacent the center portion thereof to define respective flexible portions to permit unidirectional bending toward and away from the person's head, whereby said arms conform to and exert inwardly directed pressure on a person's head to support the spectacle structure thereon.

7. The spectacle structure set forth in claim 5 wherein:
   (a) said head engaging means include a flexible, elastic band for contractively maintaining said front frame member in engagement with a person's head.

8. A spectacle structure for use in sports and the like to protect the wearer's eyes from moving objects comprising:
   (a) a wrap-around front frame member having portions curvingly extended around the front of the head and rearward of the eyes of a person wearing the spectacle structure at a level adjacent to the eyes, said front frame member having a centrally positioned nose engaging bridge portion with respective upper and lower slightly elastically resilient bow portions extended laterally outward therefrom and curved rearwardly in converging relation and joining in rearwardly positioned end portions, said bow portions being separated and forming spaced apart guard members defining elongated, outwardly and rearwardly curved, generally tear-drop shaped openings extending rearward of the eyes of a person wearing the spectacle structure and having channels extended therein generally annularly around a portion of said openings;

(b) lens means having substantially lesser curved horizontal axes than said rearwardly curved openings and mounted in said channels and contractively retained by said bow portions in said openings forwardly of the person's eyes and supported by said front frame member, said openings having substantial space portions not covered by the area of the lens means and extending in curved relation outwardly and rearwardly of said lens means exposing a lateral end of said lens means;

(c) a brow engaging member positioned slightly above said front frame member and connected thereto, said brow engaging member extending rearwardly of said front frame member for engagement with the person's brow and positioning the front frame member in forwardly spaced relation to the person's brow and face;

(d) a cover member detachably and pivotally connected to said front frame member and having laterally spaced transparent, wrap-around portions positioned generally over said lens means and said openings in spaced relation thereto, said transparent, wrap-around portions each being larger in width and extending substantially the length of the respective said openings to shield the openings and lens means from moving objects; and (e) head engaging arms connected to said end portions and extended rearwardly therefrom and having flexible portions permitting uni-directional bending toward and away from the person's head, said arms cooperating with said bridge portion and said brow engaging member for maintaining said bridge portion and said brow engaging member in engagement with respective nose and brow areas of the person's head and said lens means in aligned position relative to the person's eyes.

* * * * *